Dec. 13, 1966  V. F. LANG  3,291,179
CAMERA CARRYING CASE
Filed Feb. 17, 1964
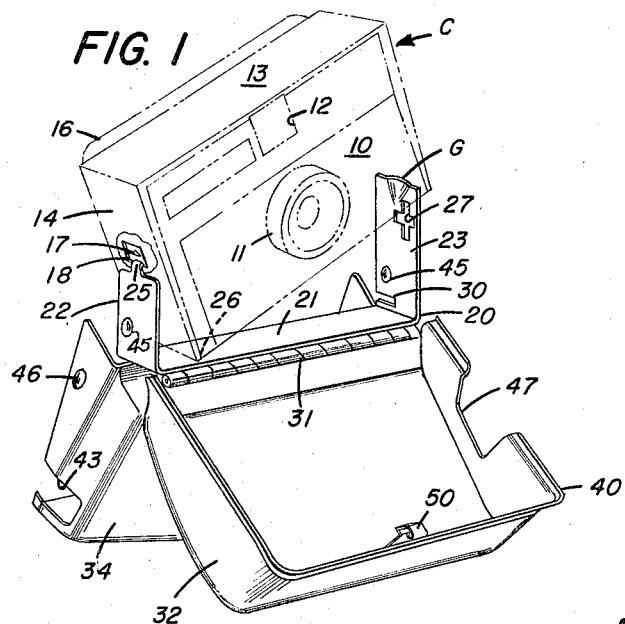
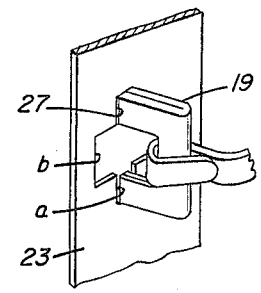
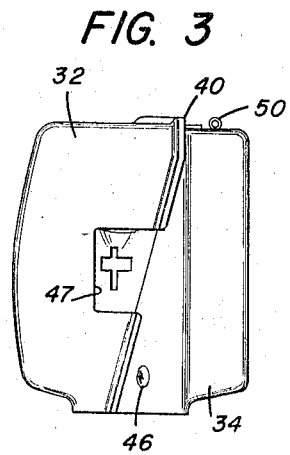
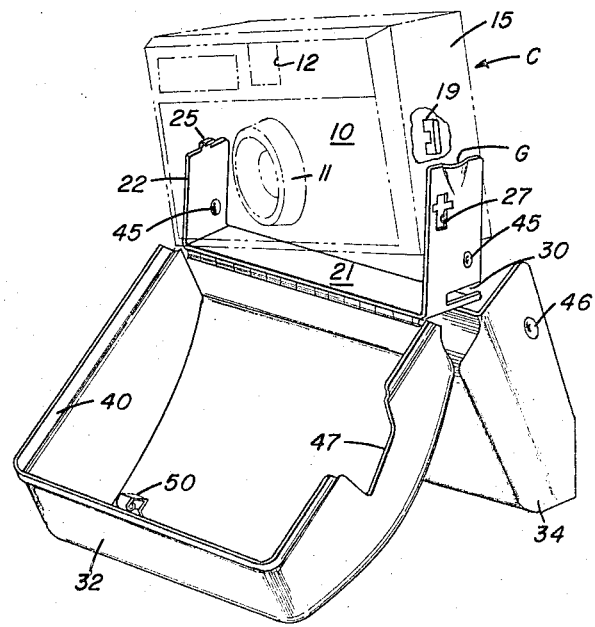
VINCENT F. LANG
INVENTOR.
BY
ATTORNEYS United States Patent Office 3,291,179
Patented Dec. 13, 1966

3,291,179
CAMERA CARRYING CASE
Vincent F. Lang, Rochester, N.Y., assignor to Eastman Kodak Company, Rochester, N.Y., a corporation of New Jersey
Filed Feb. 17, 1964, Ser. No. 345,307
7 Claims. (Cl. 150—52)

The present invention relates to a carrying case for cameras, and particularly to a camera carrying case in which a camera is fastened in such a way that it can be readily and rapidly removed from and inserted into the case when desired, and which case is so designed that the camera can be loaded with film while the camera remains in the case.

Camera carrying cases are known in which the camera is fastened in the case by a rotatable screw carried by and extending through a base member of the case, and which is adapted to be screwed into the conventional tripod screw socket on the base of the camera to affix the camera within the case. Such fastening means cannot accommodate a camera not provided with a threaded tripod screw socket in its base and it makes the insertion and removal of a camera a rather tedious and slow operation because of the difficulty in first establishing the threaded connection between the screw and the threaded socket and then turning the screw down sufficiently to hold the camera tightly in place.

When designing the carrying case for a camera which does not have the conventional tripod screw socket in the bottom wall thereof this conventional type of fastening means cannot be used. The line of Kodak Instamatic Camera which were announced to the trade last March are representative of cameras which have no tripod screw socket in the base thereof. Accordingly, the carrying cases first designed for this line of cameras were of the type shown in pending U.S. design applications Des. 77,622 and 77,623 filed November 29, 1963, and which issued as U.S. Patents Nos. 200,990 and 200,991 on April 27, 1965. These carrying cases comprise a body portion which embraces the two end walls and back wall of the camera and are attached to the camera body by a strap which extends across the front of the camera and encircles the lens mount. A flap connected to the lower edge of the body portion is adapted to fold upwardly and form the front and top of the case when it is closed. Since this line of cameras has a hinged back which must be opened to load the camera with film, every time it was desired to change the film in this camera when it was in one of these carrying cases it was necessary to unsnap one end of the cross strap and remove the camera completely from the case. This procedure defeated the main purpose of the Kodak Instamatic Camera design, namely the easy and rapid film load feature.

Therefore, the primary object of the present invention is to provide a carrying case for a camera which is so designed that the camera can be readily and rapidly inserted into and moved therefrom, and when it is inserted into the case it is attached to a part thereof.

Another object is to provide a camera carrying case in which the camera is so mounted in the case that it can be loaded with film without having to remove it from the case.

And still another object is to provide a camera carrying case comprising a base member to which the camera is detachably connected in a rapid manner and without the need for the manipulation of screws or similar fastening means, and to which base member two cup-shaped members are individually hinged to be selectively moved between a closed position in which they combine with said base member to enclose the camera, and an open position in which said camera front is exposed for taking pictures and/or said camera back is exposed so that it can be opened to change the film in the camera while it is attached to said base member.

The novel features that I consider characteristic of my invention are set forth with particularity in the appended claims. The invention itself, however, both as to its organization and its methods of operation, together with additional objects and advantages thereof, will best be understood from the following description of a specific embodiment when read in connection with the accompanying drawings in which:

FIGS. 1 and 2 are perspective views from different angles showing the carrying case constructed in accordance with a preferred embodiment of the present invention in an open condition and illustrating how a camera is to be inserted into and removed therefrom;

FIG. 3 is an end view of the carrying case in a closed condition; and

FIG. 4 is an enlarged detail of a part shown in FIGS. 1 and 2 illustrating the method of connecting a carrying strap to the camera.

This carrying case was particularly designed for use with certain of the Kodak Instamatic Cameras which were announced to the trade last year and which is schematically shown in the drawings to illustrate how the case of the present invention operates. Since this particular line of cameras is well known, being fully disclosed in one or more patents or patent applications, including design patents, Des. 196,084 and 196,085, issued August 20, 1963, only those features thereof which are particularly pertinent to the present carrying case have been shown and will be described. This camera designated generally at C is of a substantially rectangular configuration and includes a front wall 10 and in which the lens 11 and front element of the viewfinder 12 are mounted, a top wall 13, a bottom wall, not shown, and two end walls 14 and 15 which are spaced apart in parallel relation. The back of the camera is closed by a cover 16 which is hinged to one of the end walls, in a manner not shown, so that it can be swung open for loading the camera with a film cartridge. The latch for the hinged cover is released by a slidable latch member 17 which is accessible through an opening 18 in the end wall 14. Projecting from the other end wall 15 is an apertured fastener 19 (shown in detail in FIG. 4) to which a snap S on the end of a carrying wrist strap, not shown, may be detachably connected. This camera may include a built-in flasholder and flash synchronizer requiring batteries for powering the same, and which batteries may be inserted into the camera through a door in the bottom of the camera. To permit changing of these batteries, which may be only once or twice a year, the camera must be removed from the carrying case. So as not to obscure, but clearly illustrate, the structure of the carrying case constituting the present invention, all parts of the camera except those actually engaged by the case have been shown in broken lines.

The carrying case according to the present invention comprises a U-shaped bracket 20 consisting of a cross member 21 from the opposite ends of which two arms 22 and 23 extend upwardly. The U-shaped bracket 20 is dimensioned so that the cross member 21 extends the full length of the camera bottom wall and the arms 22 and 23 embrace the end walls 14 and 15, respectively, of the camera, when it is inserted into the open side of the bracket as will be described hereinafter. The bracket 20 is preferably formed up out of a strip of spring steel, or like resilient material, so that one or both of the arms 22 and 23 can be initially bent toward one another to make the separation between them slightly less than the separation of the end walls of the camera so that they must be separated to insert the camera between them. Thus when the camera is inserted into the bracket in a cocked position as shown in FIGS. 1 and 2, one or both of the arms may spring apart to allow the camera bottom wall to be seated on the cross member 21 after which the upright arms 22 and 23 will press toward the end walls of the camera which they embrace to frictionally retain the camera in the bracket or to positively lock the camera in the bracket as will be described below.

In order to positively fasten the camera in the bracket the upper edge of the arm 22 is provided with a turned over lug or hook member 25 which is adapted to extend into the opening 18 in the end wall 14 of the camera and overhang the bottom edge thereof. The other arm 23 of the bracket is provided with a cross slot 27 the vertical portion $a$ of which is of such dimension and location that it will permit the apertured fastener 19 on the end wall 15 to project therethrough as shown in FIG. 4 when the bottom wall of the camera is seated on the cross member of the bracket. The horizontal portion $b$ of the slot 27 is provided to facilitate attachment of snap S of a camera wrist strap (not shown). As illustrated in FIGS. 1 and 2, all that is necessary to insert the camera into the bracket 20 is to insert the camera into the open side of the bracket in the cocked position as shown and hook the lug or hook member 25 on arm 22 over the lower edge of the opening 18 in the end wall 14 of the camera. When this is done the lower lefthand corner 26 of the camera will be resting on the cross member 21 and the lower righthand corner of the camera will be extending above and slightly across the upper end of arm 23, see FIG. 1. Then by placing a finger in the finger grip G formed in the upper end of arm 23 the arm is pulled outwardly by a sufficiently amount to allow the lower righthand corner of the camera to engage the inside surface of the arm 23. After this the camera is merely pressed downwardly and as the camera pivots about a fulcrum formed by the hook member 25 engaging the edge of the opening 18 the lower righthand corner of the camera will cam the arm 23 of the bracket outwardly far enough to allow the apertured fastener 19 to move inside the arm. As the camera reaches the position in which its bottom wall rests upon the cross member 21 of the bracket the vertical portion $a$ of the cross slot 27 will come into alignment with the apertured fastener 19 on the end wall 15 of the camera, and then the arm 23, because of its resiliency, will snap towards the end wall of the camera and the apertured fastener 19 will be captured in the vertical portion $a$ of the cross slot 27. The camera is now positively fastened to the bracket 20 and the carrying case of which it forms a part. To remove the camera from the bracket and case it is only necessary to reverse the steps of putting the camera in the case. For example, the finger grip G in the upper end of arm 23 is grasped with the finger and the arm is sprung outwardly far enough to disengage the cross slot 27 from the apertured fastener 19 on the end wall of the camera.

Then the camera is merely rotated counterclockwise about the hooked end 25 of arm 22 until its lower righthand corner is above arm 23 of the bracket at which time the lower edge of the opening 18 in the camera end wall 14 can be pulled out of engagement with the hook member 25. The horizontal portion $b$ of the cross slot 27 is provided merely to permit the snap S on the end of the wrist strap, not shown, to be inserted through the opening in the apertured fastener 19 after the camera is inserted into the bracket 20. The notch 30 shown in the back edge of the arm 23 adjacent the bottom thereof is for receiving the lower hinge arm of the camera back, not shown, as the camera back is swung open to load the camera with film.

Connected to the front edge of the cross member of the bracket 20 by a hinge 31 is a cup-shaped member 32 which may be vacuum formed from a plastic material, or may be otherwise formed, out of any suitable material. This cup-shaped member is adapted to be raised from the lowered or open position shown, where it extends downwardly from the cross member and expose the front portion of the camera for picture taking, upwardly to a closed position, shown in FIG. 3, in which it extends substantially vertically from the cross member 21 and covers the entire front and parts of the side walls and top wall of the camera. Connected to the rear edge of the cross member 21 by a hinge, not shown, but which may be like hinge 31, is a second cup-shaped member 34. This second cup-shaped member is adapted to be moved from the lowered or open position shown in FIGS. 1 and 2, where it extends downwardly from the cross member 21 and uncovers the back cover of the camera so that it can be opened to load the camera with film, upwardly to a closed position, see FIG. 3, in which it will extend substantially vertically from the cross member and cover the entire back and the parts of the side walls and top wall of the camera not covered by the cup-shaped member 32. The exposed edge of the first cup-shaped member 32 is flared out as shown at 40 to receive the exposed edge of the cup-shaped member 34 when the two are in their closed position, see FIG. 3. As shown in FIG. 3, when the two cup-shaped members 32 and 34 are moved to their closed positions they co-operate with the cross member 21 of the bracket 20 to enclose the camera and to cover the side arms 22 and 23 of the bracket 20.

Any suitable latching means may be provided for holding these two cup-shaped members in their closed position and to this end I have shown the long edge of the cup-shaped member 32 having attached thereto, and extending substantially perpendicular therefrom, a spring detent 50 which is adapted to snap into an aperture, not shown, in the long edge of the second cup-shaped member 34, see FIG. 3.

When the camera is being used for taking pictures only the front cup-shaped member 32 need be dropped to its open position and the cup-shaped member 34 will be left in its closed position. To permit the camera to be operated with its back cup-shaped member in its closed position, the side wall thereof is provided with a cut-out portion 43 to allow access to the operation of the film winding lever of the camera, not shown. Also the back wall of the back cup-shaped member 34 will be provided with suitable openings or windows, not shown, which will permit the use of the straight-through viewfinder of the camera as well as an inspection of the window in the back of the camera through which the exposure numbers on the film backing paper can be seen. To frictionally retain the back cup-shaped member 34 in its closed position when the front cup-shaped member is dropped to its open position, the arms 22 and 23 of the bracket are provided with detents 45 which snap into co-operating recesses 46 formed in the side walls of the back cup-shaped member. One side wall of the front cup-shaped member 32 is provided with a cut-out portion 47 which exposes that portion of arm 23 containing cross slot 27 when the member 32 is in its closed position to allow a wrist strap, not shown, to remain attached to the apertured projection on the side wall of the camera when the case is closed.

While I have shown the bracket 20 formed from the single piece of spring steel, it will be readily appreciated that the arms 22 and 23 could be separate from the cross member 21 and be pivoted to the ends thereof. Then instead of relying upon the resiliency of the material from which the bracket is formed to provide the limited movement and bias of the arms to hold the camera in the bracket, one or both of these separate arms could be acted on by a spring which would bias them toward each other to desired limited extents as determined by suitable stops on the cross member.

It will be understood from the above disclosure that the present camera carrying case provides for a quick and positive attachment of a camera within the case without requiring the user to first align an attaching screw rotatably connected with the case with a threaded socket in the wall of the camera and then necessitating the tightening down of the screw. When the camera is inserted into the case the two, in effect, become a single unit and the case in no way hinders the normal use of the camera, even to the extent of loading and unloading of film. It will be seen that the design of this carrying case is compatible with the intent of the Kodak Instamatic Camera, namely it permits a quick loading of the camera with film without having to remove the camera from the camera carrying case.

Having thus disclosed my invention, what I claim is new and novel and desire to secure by Letters Patent of the United States is:

1. A carrying case for a photographic camera having a bottom wall, a pair of substantially parallel end walls, a front wall and a back wall which is separable from the camera to permit loading of film into the camera; and comprising a substantially U-shaped bracket defining a cross member adapted to engage the bottom wall of the camera when the camera is inserted in said bracket and defining upright arms adapted to engage and embrace the end walls of the camera to retain the camera within said bracket, first and second cup-shaped members individually hinged to opposite edges of said cross member to selectively move between a closed position, wherein they extend upwardly from said cross member and combine with said cross member to enclose the camera when the camera is positioned in said bracket, and an open position, wherein said first cup-shaped member extends downwardly from said cross member to expose the front of the camera and said second cup-shaped member extends downwardly from said cross member to expose the back wall of the camera.

2. A camera carrying case according to claim 1, in which at least one of said upright arms of said U-shaped bracket and said second cup-shaped member have detent means which co-operate to retain said second cup-shaped member in said closed position when it is moved to said closed position.

3. A camera carrying case according to claim 1, in which at least one of said upright arms of said U-shaped bracket is connected to said cross member for limited movement relative to said cross member, and is normally biased toward the other upright arm and into a position wherein the normal separation between said upright arms is less than the separation between the end walls of the camera, whereby when the camera is inserted into said bracket the end walls thereof are securely engaged by said upright arms to retain the camera in said bracket.

4. A carrying case for a photographic camera having a bottom wall, a pair of substantially parallel end walls each provided with a surface extending at an angle to the plane of the end wall which it is on, a front wall, and a back wall which is separable from the camera to permit loading of film into the camera; and comprising (1) a substantially U-shaped bracket defining a cross member adapted to engage the bottom wall of the camera when the camera is inserted in said bracket and defining upright arms adapted to engage and embrace the endwalls of the camera to retain the camera within said bracket:

(2) latch means on each of the upright arms of said bracket for positively engaging the surfaces on opposite end walls of the camera when the camera is inserted into said bracket to positively lock the camera in said bracket;

(3) at least one of said upright arms connected to said cross member for limited movement toward and from the other upright arm and normally biased to a position wherein the normal separation between said arms is such as to urge the latch means on said one upright arm into positive engagement with the corresponding surface on the end wall of the camera it embraces when the camera is inserted into said bracket;

(4) means for selectively moving said one upright arm from its normal position to disengage the latch means thereon from engagement with the surface on the camera end wall engaged thereby to permit removal of the camera from said bracket;

(5) first and second cup-shaped members hinged to opposite edges of said cross member to selectively move between a closed position, wherein they each extend upwardly from said cross member and combine with said cross member to enclose the camera when the camera is positioned in said bracket, and an open position, wherein said first cup-shaped member extends downwardly from said cross member to expose the front wall of the camera, and said second cup-shaped member extends downwardly from said cross member to expose the back wall of the camera.

5. A camera carrying case according to claim 4 in which said U-shaped bracket is made of a resilient material the resilient characteristic of which allows a limited movement of said one upstanding arm toward and from said other upstanding arm; said bracket being initially formed so that the separation between said arms is such as to require separation thereof for inserting the camera into said bracket.

6. A camera carrying case according to claim 4, wherein the surface on one end wall of the camera is the edge of a recess formed in one end wall of the camera, and the surface on the other end wall of the camera comprises a part projecting outwardly from the other end wall; and in which the latch means on one of said upright arms comprises an integral hook member adapted to extend into and overhang the edge of the recess in the one end wall of the camera when the camera is inserted into said bracket; and said latch means on the other upstanding arm comprises a recess in the other upstanding arm into which the part extending outwardly of the other end wall of the camera extends in latching engagement therewith.

7. A carrying case for a photographic camera having a bottom wall, a pair of substantially parallel end walls, a front wall and a back wall; and comprising a substantially U-shaped bracket defining a cross member adapted to engage the bottom wall of the camera when the camera is inserted in said bracket and defining arms extending from said cross member adapted to engage and embrace the end walls of the camera to retain the camera within said bracket, and first and second cup-shaped members pivotally mounted on said cross member for enclosing the front and back walls of the camera respectively.

(References on following page)

References Cited by the Examiner

UNITED STATES PATENTS

| | | | |
|---|---|---|---|
| D. 196,084 | 8/1963 | Zagara | D61—1 |
| D. 196,085 | 8/1963 | Zagara | D61—1 |
| D. 198,729 | 7/1964 | Lang et al. | D87—5 |
| D. 200,990 | 4/1965 | Lang | D87—5 |
| D. 200,991 | 4/1965 | Lang | D87—5 |
| 1,042,963 | 10/1912 | Peterson | 150—52.8 |
| 1,366,560 | 1/1921 | Dahlgren | 206—41 |
| 2,535,152 | 12/1950 | Nelson | 95—86 |
| 2,681,600 | 6/1954 | Heidecke | 95—11 |
| 2,804,226 | 8/1957 | Freedman | 312—199 X |
| 2,873,082 | 2/1959 | Gillespie | 248—316.5 X |
| 2,966,257 | 12/1960 | Littlejohn | 206—45.13 |
| 2,991,876 | 7/1961 | Shiffman | 206—45.13 |

FOREIGN PATENTS

| | | |
|---|---|---|
| 168,691 | 7/1951 | Austria. |
| 696,892 | 9/1953 | Great Britain. |
| 280,511 | 5/1952 | Switzerland. |

GEORGE O. RALSTON, *Primary Examiner.*

JOSEPH R. LECLAIR, FRANKLIN T. GARRETT,
*Examiners.*

M. L. MINSK, *Assistant Examiner.*